(12) United States Patent
Sos-Munoz et al.

(10) Patent No.: US 9,348,561 B2
(45) Date of Patent: May 24, 2016

(54) TABULAR FORMAT TRANSACTION EDITOR

(71) Applicant: InvestCloud Inc, Beverly Hills, CA (US)

(72) Inventors: Vicent Sos-Munoz, Beverly Hills, CA (US); John W. Wise, West Hollywood, CA (US)

(73) Assignee: InvestCloud, Inc, Beverly Hills, CA (US)

( * ) Notice: Subject to any disclaimer, the term of this patent is extended or adjusted under 35 U.S.C. 154(b) by 0 days.

(21) Appl. No.: 14/284,371

(22) Filed: May 21, 2014

(65) Prior Publication Data

US 2015/0339106 A1    Nov. 26, 2015

(51) Int. Cl.
*G06F 17/00* (2006.01)
*G06F 9/44* (2006.01)
*G06F 17/30* (2006.01)

(52) U.S. Cl.
CPC .. *G06F 8/34* (2013.01); *G06F 8/00* (2013.01); *G06F 17/30* (2013.01)

(58) Field of Classification Search
CPC ......... G06F 17/246; G06F 17/30; G06F 8/30; G06F 11/3688; G06F 8/34; G06F 8/38; G06Q 10/10; G06Q 10/06
See application file for complete search history.

(56) References Cited

U.S. PATENT DOCUMENTS

| | | | |
|---|---|---|---|
| 5,119,465 A | 6/1992 | Jack et al. | |
| 6,631,497 B1 | 10/2003 | Jamshidi et al. | |
| 8,584,084 B2* | 11/2013 | Breton | G06F 8/38 717/108 |
| 8,640,022 B2* | 1/2014 | Waldman | G06F 17/3089 715/210 |
| 8,645,911 B2* | 2/2014 | Dorman | G06F 9/45512 715/212 |
| 8,689,095 B2* | 4/2014 | Parish | G06F 17/246 709/203 |
| 8,707,159 B1* | 4/2014 | Strong | G06F 17/30905 715/227 |
| 2002/0123952 A1* | 9/2002 | Lipper, III | 705/36 |
| 2003/0106040 A1 | 6/2003 | Rubin et al. | |
| 2004/0148307 A1 | 7/2004 | Rempell | |
| 2004/0260691 A1 | 12/2004 | Desai et al. | |
| 2005/0039114 A1* | 2/2005 | Naimat | G06F 17/30427 715/234 |
| 2007/0162840 A1* | 7/2007 | Rochelle | G06F 17/2247 715/210 |
| 2007/0220415 A1* | 9/2007 | Cheng et al. | 715/503 |
| 2009/0006409 A1 | 1/2009 | Yang et al. | |
| 2009/0158139 A1* | 6/2009 | Morris | G06F 17/246 715/234 |
| 2011/0055681 A1* | 3/2011 | Smialek et al. | 715/219 |
| 2012/0102010 A1 | 4/2012 | Brueggerhoff et al. | |
| 2013/0132927 A1 | 5/2013 | Kraft et al. | |
| 2013/0151938 A1* | 6/2013 | Waldman | G06F 17/3089 715/210 |
| 2014/0129912 A1* | 5/2014 | Kannala | G06F 17/246 715/215 |
| 2014/0289601 A1* | 9/2014 | Wang | G06F 3/04886 715/217 |

OTHER PUBLICATIONS

Benson et al., Spreadsheet driven web applications, Oct. 2014, 10 pages.*
Chang et al., Creating interactive web data applications with spreadsheets, Oct. 2014, 10 pages.*

* cited by examiner

*Primary Examiner* — Thuy Dao
(74) *Attorney, Agent, or Firm* — Patent Ingenuity, P.C.; Samuel K. Simpson

(57) ABSTRACT

A process receives a plurality of inputs in a tabular format transaction editor. Further, the process generates, with a processor, runtime code that utilizes the plurality of inputs and is operable independently of the tabular format transaction editor.

20 Claims, 5 Drawing Sheets ated manually by computer programmers. The computer code is required to provide functionality to perform a task or resolve a problem in a certain field of knowledge. Specialists in that field of knowledge are often unfamiliar with the intricacies of computer programming and have to rely on computer programmers to interpret their specifications to produce computer code.

TABULAR FORMAT TRANSACTION EDITOR

BACKGROUND

1. Field

This disclosure generally relates to the field of computing devices. More particularly, the disclosure relates to computer code generation.

2. General Background

Computer code is typically generated manually by computer programmers. The computer code is required to provide functionality to perform a task or resolve a problem in a certain field of knowledge. Specialists in that field of knowledge are often unfamiliar with the intricacies of computer programming and have to rely on computer programmers to interpret their specifications to produce computer code.

As an example, many business analysts often utilize computers to perform business calculations for various business tasks. Such business analysts are familiar with utilizing computers, but not generating code to perform business tasks. When various business tasks are required, such business analysts often utilize various intermediaries to write code for a computer application for those tasks. As a result, many resources are expended to obtain production ready code for the business analysts through various intermediaries.

Business analysts or any other professionals needing production ready code to generate applications to perform tasks often have to wait for intermediary computer programmers to generate code and then possibly wait yet again if any modifications are needed to the applications generated by the code. Such delays lead to inefficiencies for the performance of tasks.

Accordingly, previous configurations do not generate production ready code for an application without utilizing an intermediary that manually generates the code for an application that is customized for the user. Such previous configurations are limited to systems that most users are unfamiliar with and often have difficulty utilizing.

SUMMARY

In one aspect of the disclosure, a process is provided. The process receives a plurality of inputs in a tabular format transaction editor. Further, the process generates, with a processor, runtime code that utilizes the plurality of inputs and is operable independently of the tabular format transaction editor.

In another aspect of the disclosure, a computer program product includes a computer useable medium having a computer readable program. The computer readable program when executed on a computer causes the computer to receive a plurality of inputs in a tabular format transaction editor. Further, the computer readable program when executed on the computer causes the computer to generate, with a processor, runtime code that utilizes the plurality of inputs and is operable independently of the tabular format transaction editor.

In yet another aspect of the disclosure, an apparatus is provided. The apparatus comprises a computing device that receives a plurality of inputs in a tabular format transaction editor and generates runtime code that utilizes the plurality of inputs and is operable independently of the tabular format transaction editor.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method, system, apparatus, and computer program product may be utilized to provide a tabular transaction editor. The tabular transaction editor receives inputs and generates runtime code based upon the inputs so that an application is generated. The application is operable independently of the tabular format transaction editor.

An example of a tabular transaction editor is a spreadsheet program. Users such as business analysts may be unfamiliar with the intricacies of computer programming, but are often quite familiar with utilization of a spreadsheet program. For instance, many business analysts utilize spreadsheets programs as their main application to perform various tasks on a regular basis.

The tabular format transaction editor allows a user to provide inputs to a tabular transaction editor that the user is familiar with, e.g., a spreadsheet program, and then generate production ready code for an application, e.g., a portal, from the tabular transaction editor. The application may then be operated by an application user independently of the tabular transaction editor. For example, a business analyst may provide inputs to a spreadsheet program to generate a portal webpage that displays the status of an application user account associated with a business entity. After generating the code from the spreadsheet program, the business analyst may implement the portal webpage to operate independently of the spreadsheet program. In other words, the business analyst generates the production ready code for the portal webpage with the spreadsheet program such that the portal webpage may then be deployed to a server for operation. The portal webpage may operate independently of the spreadsheet program after deployment to the server.

As a result, business analysts and other professionals are able to utilize the tabular format transaction editor to generate production ready code for an application without having any computer code writing knowledge. Business analysts and other professionals do not have to utilize intermediaries and wait for extended periods of time for such intermediaries to prepare production ready code for them. The applications, e.g., portals, may be generated according to a familiar format for business analysts and other professionals, e.g., a tabular format, without business analysts and other professionals having to write any code in a computer programming language format.

Although a spreadsheet program is provided as an example of a tabular format transaction editor, other programs that utilize a tabular format may be utilized instead of a spreadsheet program. Further, other types of applications other than portal webpages may be generated from the tabular format transaction editor. Examples of such other applications include databases, shells for applications, testing applications, etc.

Figure 1:
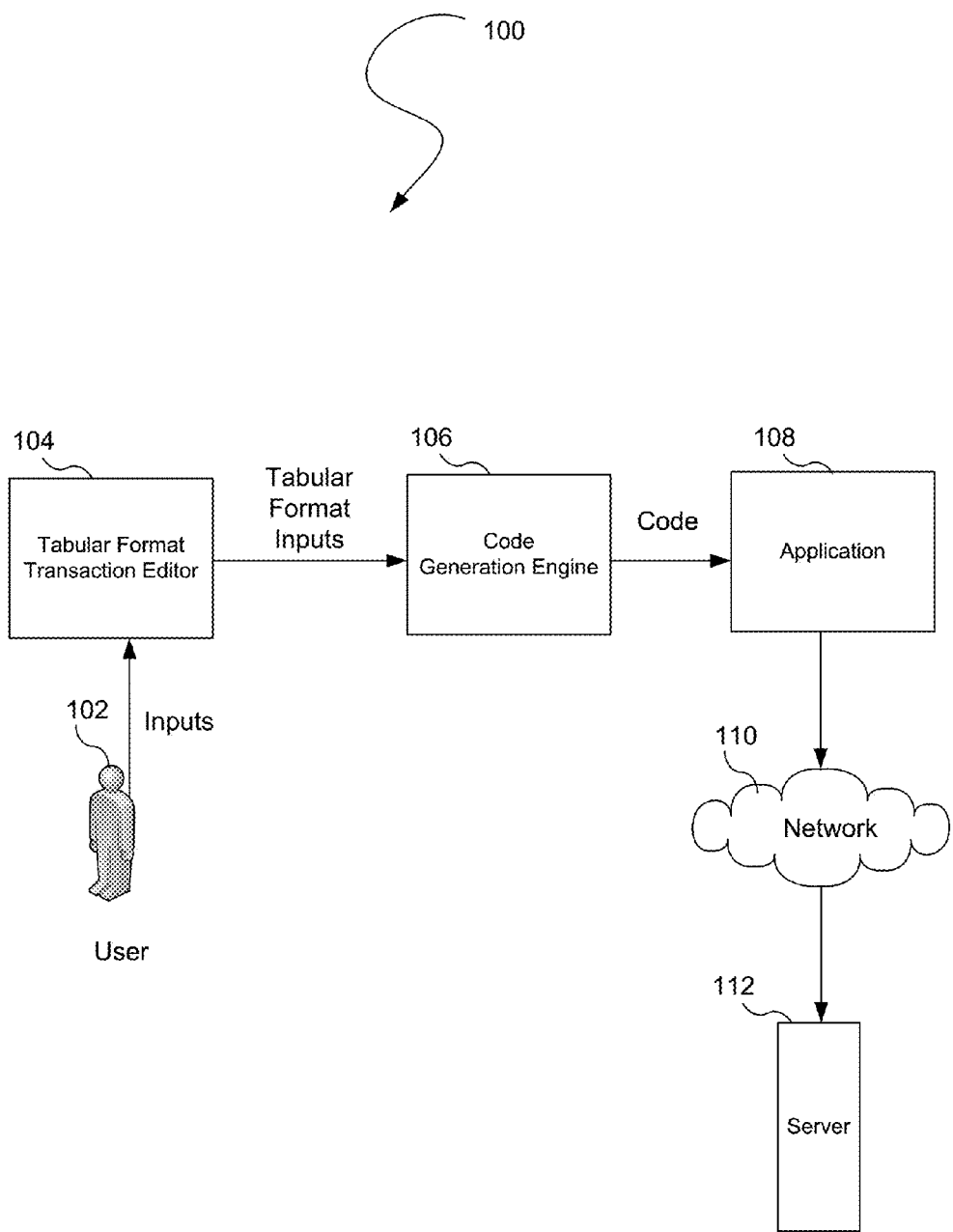
FIG. 1 illustrates a tabular format transaction editor configuration.

FIG. 1 illustrates a tabular format transaction editor configuration 100. A user 102 provides a variety of inputs to a tabular format transaction editor 104. The tabular format transaction editor 104 may be a spreadsheet program or a variety of other types of programmable editors that have a tabular format. The tabular format has a plurality of rows, columns, and/or rows and columns that are referred to as cells. The user 102 provides input to the tabular format transaction editor 104 in the various cells.

Accordingly, a user 102 such as a business analyst may provide inputs in a familiar format such as the tabular format provided by a spreadsheet program. Those tabular format inputs are then provided to a code generation engine 106. The code generation engine 106 generates an intermediary set of code between the tabular format transaction editor 104 code and an operating system. In one embodiment, the intermediary set of code is represented as metadata. Various other formats may be utilized for the intermediary set of code. After the user 102 provides inputs to the tabular format transaction editor 104, the user 102 may then provide a command to the code generation engine 106 to generate the intermediary set of code.

The code generation engine 106 may then utilize a processor to translate the tabular format inputs into the intermediate set of code. The intermediary set of code may be platform independent or specific to a given platform. Accordingly, the code generation engine 106 may receive tabular format inputs in a variety of different computer programming language formats from a variety of different types of computing devices. A computing device may be a personal computer, laptop, notebook computer, smartphone, tablet device, etc.

As a result, an application 108 that is production ready is generated without the user 102 having to manually generate any computer code. The code generation engine 106 automatically generates the code for the application 108. In one embodiment, the code generation engine 106 also compiles the code for the application 108 into a machine readable format. The code generation engine 106 may compile the code for the application 108 into particular machine readable code for a particular operating system or may compile a variety of sets of machine readable code for different operating systems. The code generation engine 106 may receive a command from the user 102 to compile the code or may automatically compile the code.

In one embodiment, the application 108 may then be deployed through a network 110 to a server 112. The application 108 may be deployed via a command from the user 102 or automatically after generation of the application 108. As an example, a web portal may be generated and deployed to the server 112 for operation.

The tabular format inputs provided by the user 102 may vary for different applications. For example, the tabular format inputs may be database fields for a database application whereas the tabular format inputs may be list of properties for a server application. The tabular format inputs represent the components of the application. For instance, the components of the application may be the graphical components that are represented in the application.

Figure 2:
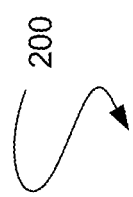
FIG. 2 illustrates an example of a graphical representation of the transaction editor illustrated in FIG. 1.

FIG. 2 illustrates an example of a graphical representation 200 of the transaction editor 104 illustrated in FIG. 1. The graphical representation 200 provides a spreadsheet format in which the user 102, e.g., a business analyst, illustrated in FIG. 1 may provide inputs to generate a product order web portal. The graphical representation 200 provides categories such as screen details and field list. A variety of other types of application components may be utilized as the application components may customized for the particular user 102.

The screen details include some information that may or may not be displayed to the user 102, e.g., version, authentication, server, etc. Further, the screen details include some information that is displayed to the user such as ScreenDisplayLabel. This particular example as a ScreenDisplayLabel of Product Order Entry. Accordingly, the display screen will display the label Product Order Entry.

The field list provides the user 102 with the ability to arrange various fields and other data that is displayed by the application 108. For example, the user 102 may assign a particular sequence for display to the fields and other data. Further, the user may assign positions of the fields and other data through logical rows and/or logical columns. Logical rows are illustrated for illustrative purposes. For example, the user 102 may assign fields such as ProductID, ProductName, Quantity, and Price to a first logical row. Further, the user 102 may then assign fields such as Button.Ok and Button.Cancel to a second logical row. Various properties such as Content, Condition, and FieldLabel may then be specified.

Accordingly, the user 102 may automatically generate the application 108 without having any computer programming language knowledge. The user 102 may construct an application 108 by arranging and determining parameters in a tabular format.

Figure 3:
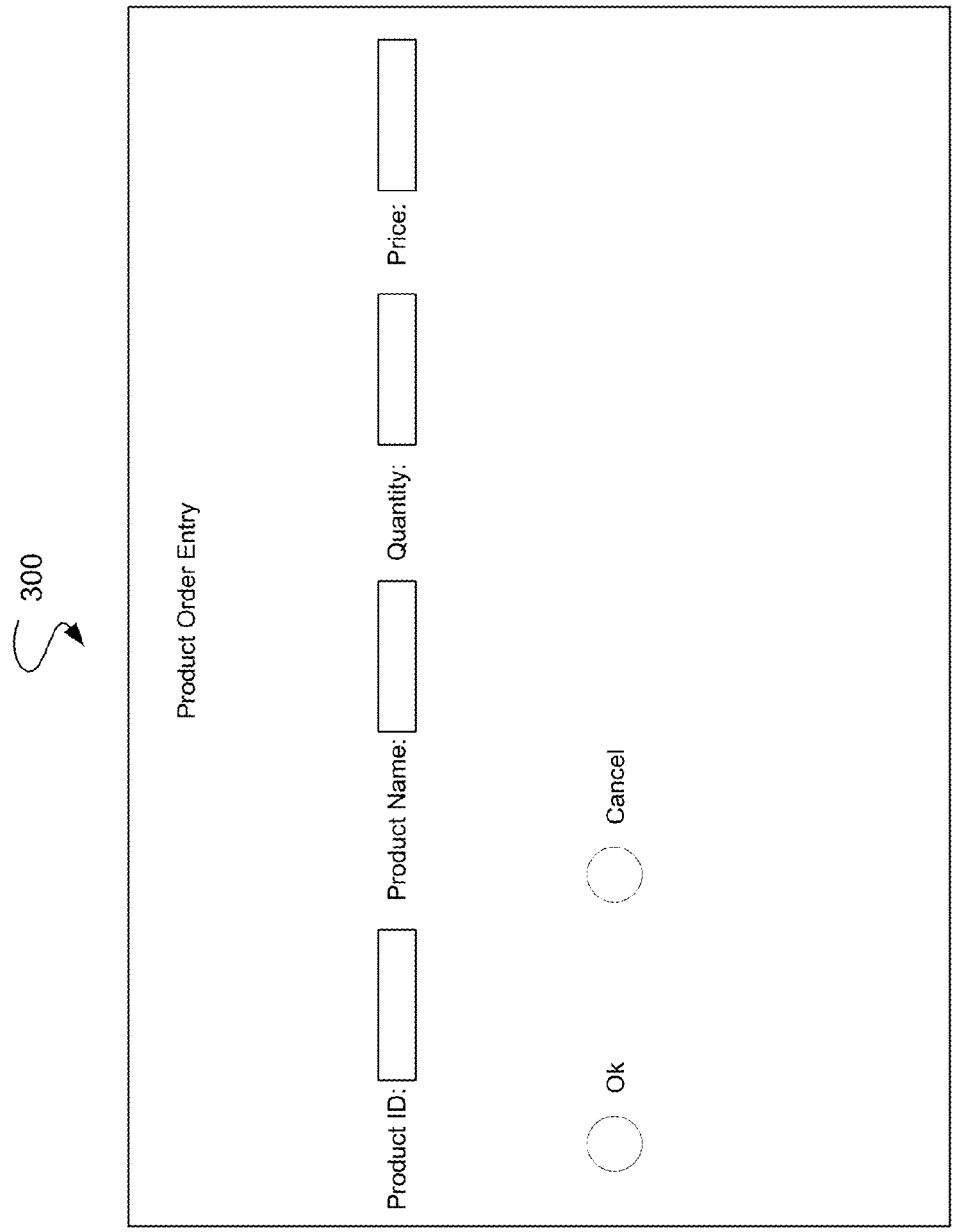
FIG. 3 illustrates an example of a display screen generated by the code generation engine for the application illustrated in FIG. 1 according to the tabular format inputs provided in the graphical representation illustrated in FIG. 2.

FIG. 3 illustrates an example of a display screen 300 generated by the code generation engine 106 for the application 108 illustrated in FIG. 1 according to the tabular format inputs provided in the graphical representation 200 illustrated in FIG. 2. The display screen 300 is labeled Product Order Entry as specified by the tabular format input for ScreenDisplayLabel. Further, the display screen 300 illustrates a variety of fields such as Product ID, Product Name, Quantity, and Price in a first logical row as specified by the tabular format input. The field names are specified by the FieldLabel component illustrated in FIG. 2. Some fields may require input from the user whereas other fields may automatically derive a parameter for display. For example, the ProductID field has a mandatory condition. Accordingly, the Product ID field requires an input from an application user. The ProductName field has a derived condition. Accordingly, the ProductName may be automatically determined based upon the ProductID inputted by the application user. The display screen 300 also displays buttons such an Ok button and a Cancel button according to the tabular format input for a second logical row. The application user marks buttons for these components as a button parameter was utilized for these components in the tabular format inputs.

The display screen 300 is an example of a display screen for the application 108. The application 108 may be operated independently of the tabular format transaction editor 104. In other words, the user 102, e.g., a business analyst, may provide the tabular inputs in the transaction editor 104 to automatically generate the code for the application 108 via the code generation engine 106. The application 108 may then be operated by an application user independently of the transaction editor 104.

The tabular format transaction editor 104 allows the user 102 to generate code by positioning application components into a virtual matrix, e.g., the tabular format. Further, the tabular format transaction editor 104 may be utilized to link a variety of different tabular formats, e.g., spreadsheets, together. For example, the display screen 300 may illustrate only a portion of a product entry web portal. The product entry web portal may have a variety of web pages that are linked together. The tabular format transaction editor 104 allows the user 102 to construct each page of the web portal and then link those web portal pages together. Such linking may be performed by tabular format inputs, e.g., reference fields within the various tabular formats. Various spatial relationships and database operations, e.g., joins, sorts, etc., may be performed on the various tabular formats.

Figure 4:
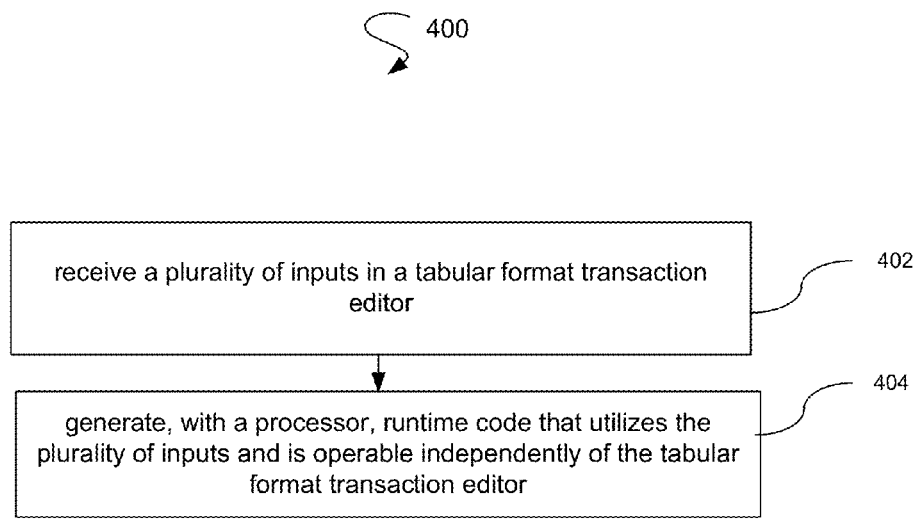
FIG. 4 illustrates a process that may be utilized to generate the application illustrated in FIG. 1 via the tabular format transaction editor illustrated in FIG. 1.

FIG. 4 illustrates a process 400 that may be utilized to generate the application 108 illustrated in FIG. 1 via the tabular format transaction editor 104 illustrated in FIG. 1. At a process block 402, the process 400 receives a plurality of inputs in a tabular format transaction editor. Further, at a process block 404, the process 400 generates, with a processor, runtime code that utilizes the plurality of inputs and is operable independently of the tabular format transaction editor.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code, intermediary language or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. The transaction editor configurations described herein are device-independent as they may be utilized to generate code for a variety of types of computing devices such as personal computers, laptops, tablet devices, smartphones, kiosks, set top boxes, etc.

Figure 5:
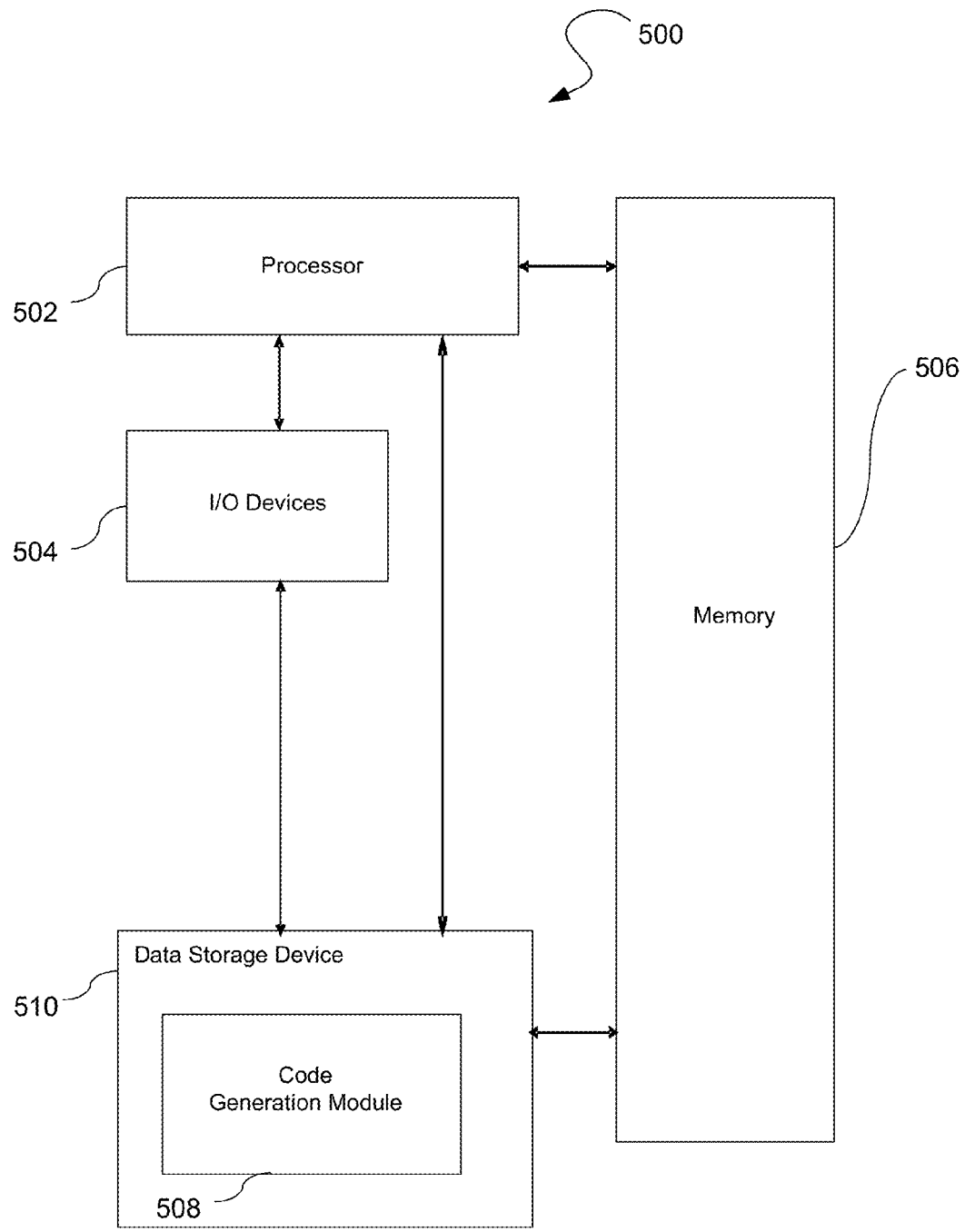
FIG. 5 illustrates a block diagram of a station or system that performs code generation.

FIG. 5 illustrates a block diagram of a station or system 500 that performs code generation. In one embodiment, the station or system 500 is implemented utilizing a general purpose computer or any other hardware equivalents. Thus, the station or system 500 comprises a processor 502, a memory 506, e.g., random access memory ("RAM") and/or read only memory (ROM), a code generation module, a data storage device 510 that stores the code generation module 508, and various input/output devices 504, e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device such as a keyboard, a keypad, a mouse, and the like, or a microphone for capturing speech commands.

It should be understood that the code generation module 508 may be implemented as one or more physical devices that are coupled to the processor 502. For example, the code generation module 508 may include a plurality of modules. Alternatively, the code generation module 508 may be represented by one or more software applications or a combination of software and hardware where the software is loaded from a storage medium such as a storage device, e.g., a magnetic or optical drive, diskette, or non-volatile memory and operated by the processor 502 in the memory 506 of the computer. As such, the code generation module 508 and associated data structures of the present disclosure may be stored on a computer readable medium such as a computer readable storage device, e.g., RAM memory, magnetic or optical drive or diskette and the like.

The station or system 500 may be utilized to implement any of the configurations. In one embodiment, the code generation module 508 is integrated as part of the processor 502.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A method comprising:
    displaying data input categories in a tabular format transaction editor, the data input categories comprising authentication information, server identification, display sequence, and field positioning;
    receiving a plurality of user inputs in the data input categories of the tabular format transaction editor; and
    generating, with a processor, runtime code based upon the plurality of user inputs in the data input categories from the tabular format transaction editor through automatic compilation without a manual user input, the runtime code being operable independently of the tabular format transaction editor, the runtime code being operable to generate a graphical representation according to the plurality of inputs in the data input categories.

2. The method of claim 1, wherein the tabular format transaction editor is a spreadsheet computer program.

3. The method of claim 1, further comprising running the runtime code to display a portal based upon the plurality of user inputs.

4. The method of claim 1, wherein the runtime code is generated by translating the plurality of user inputs into commands associated with an intermediary programming language and translating the commands associated with the intermediary programming language into operating system commands, the intermediary programming language being platform independent.

5. The method of claim 1, wherein the runtime code is generated without the plurality of user inputs having commands provided in a programming language format.

6. The method of claim 1, wherein the plurality of user inputs defines a set of display properties such that the runtime code displays a display according to the set of display properties.

7. The method of claim 1, further comprising generating metadata based upon the plurality of user inputs.

8. The method of claim 7, further comprising deploying the metadata to a server.

9. The method of claim 8, wherein the server compiles the runtime code from the metadata.

10. The method of claim 1, wherein the runtime code is utilized to display a test display.

11. A computer program product comprising a non-transitory computer useable medium having a computer readable program, wherein the computer readable program when executed on a computer causes the computer to:

displaying data input categories in a tabular format transaction editor, the data input categories comprising authentication information, server identification, display sequence, and field positioning;

receive a plurality of user inputs in the data input categories of the tabular format transaction editor; and generate, with a processor, runtime code based upon the plurality of user inputs in the data input categories from the tabular format transaction editor through automatic compilation without a manual user input, the runtime code being operable independently of the tabular format transaction editor, the runtime code being operable to generate a graphical representation according to the plurality of inputs in the data input categories.

12. The computer program product of claim 11, wherein the tabular format transaction editor is a spreadsheet computer program.

13. The computer program product of claim 11, wherein the computer is further caused to run runtime code to display a portal based upon the plurality of user inputs.

14. The computer program product of claim 11, wherein the runtime code is generated by translating the plurality of user inputs into commands associated with an intermediary programming language and translating the commands associated with the intermediary programming language into operating system commands, the intermediary programming language being platform independent.

15. The computer program product of claim 11, wherein the runtime code is generated without the plurality of user inputs having commands provided in a programming language format.

16. The computer program product of claim 11, wherein the plurality of user inputs defines a set of display properties such that the runtime code displays a display according to the set of display properties.

17. The computer program product of claim 11, wherein the computer is further caused to generate metadata based upon the plurality of user inputs.

18. The computer program product of claim 17, wherein the computer is further caused to deploy the metadata to a server.

19. An apparatus comprising:

a computing device having a central processing unit that displays data input categories in a tabular format transaction editor, receives a plurality of user inputs in the data input categories of the tabular format transaction editor, generates metadata based upon the plurality of user inputs in the data input categories, deploys the metadata to a server that compiles the runtime code from the metadata, and receives the runtime code from the server, the runtime code being operable independently of the tabular format transaction editor, the data input categories comprising authentication information, server identification, display sequence, and field positioning, the runtime code being operable to generate a graphical representation according to the plurality of inputs in the data input categories.

20. The apparatus of claim 19, wherein the tabular format transaction editor is a spreadsheet computer program.

* * * * *